(12) United States Patent
Blanton

(10) Patent No.: US 12,392,515 B2
(45) Date of Patent: *Aug. 19, 2025

(54) REFRIGERANT LEAK MANAGEMENT SYSTEMS

(71) Applicant: Johnson Controls Technology Company, Auburn Hills, MI (US)

(72) Inventor: Norman J. Blanton, Norman, OK (US)

(73) Assignee: JOHNSON CONTROLS TECHNOLOGY COMPANY, Auburn Hills, MI (US)

( * ) Notice: Subject to any disclaimer, the term of this patent is extended or adjusted under 35 U.S.C. 154(b) by 240 days.

This patent is subject to a terminal disclaimer.

(21) Appl. No.: 18/124,409

(22) Filed: Mar. 21, 2023

(65) Prior Publication Data

US 2023/0221026 A1  Jul. 13, 2023

Related U.S. Application Data

(63) Continuation of application No. 17/195,025, filed on Mar. 8, 2021, now Pat. No. 11,609,009, which is a continuation of application No. 16/912,295, filed on Jun. 25, 2020, now Pat. No. 11,365,897, which is a continuation of application No. 16/182,287, filed on Nov. 6, 2018, now Pat. No. 10,731,884.

(60) Provisional application No. 62/752,181, filed on Oct. 29, 2018.

(51) Int. Cl.
*G05D 15/00* (2006.01)
*F24F 11/36* (2018.01)
*F24F 11/77* (2018.01)
*F24F 140/12* (2018.01)

(52) U.S. Cl.
CPC .............. *F24F 11/36* (2018.01); *F24F 11/77* (2018.01); *F24F 2140/12* (2018.01)

(58) Field of Classification Search
CPC ......... F24F 11/36; F24F 11/77; F24F 2140/12
USPC ........................................................ 165/285
See application file for complete search history.

(56) References Cited

U.S. PATENT DOCUMENTS

| | | | |
|---|---|---|---|
| 8,844,301 B2 | 9/2014 | Yamashita et al. | |
| 9,302,565 B2 | 4/2016 | Johnston et al. | |
| 9,857,113 B2 | 1/2018 | Morimoto et al. | |
| 9,933,205 B2 | 4/2018 | Hatomura et al. | |
| 10,731,884 B2 * | 8/2020 | Blanton | F24F 11/36 |
| 11,365,897 B2 * | 6/2022 | Blanton | F24F 11/77 |
| 2008/0264086 A1 | 10/2008 | Liu | |
| 2015/0282643 A1 | 10/2015 | Lee et al. | |
| 2017/0284718 A1 | 10/2017 | Suzuki et al. | |

(Continued)

FOREIGN PATENT DOCUMENTS

| | | | |
|---|---|---|---|
| EP | 3315880 | | 5/2018 |
| JP | 5730238 | * | 6/2015 |
| KR | 20030085763 | * | 11/2003 |

*Primary Examiner* — Davis D Hwu
(74) *Attorney, Agent, or Firm* — Fletcher Yoder, PC

(57) ABSTRACT

A refrigerant leak management system includes a controller is configured to receive a signal indicative of a refrigerant pressure within a refrigerant circuit and determine whether the refrigerant pressure is indicative of a refrigerant leak in the refrigerant circuit. In response to determining that the refrigerant pressure is indicative of the refrigerant leak, the controller is configured to activate a fan configured to motivate air proximate the refrigerant circuit.

20 Claims, 9 Drawing Sheets

(56) References Cited

U.S. PATENT DOCUMENTS

2019/0242632 A1    8/2019    Sakae et al.

* cited by examiner

REFRIGERANT LEAK MANAGEMENT SYSTEMS

CROSS REFERENCE TO RELATED APPLICATIONS

This application is a continuation of U.S. patent application Ser. No. 17/195,025, entitled "REFRIGERANT LEAK MANAGEMENT SYSTEMS," filed Mar. 8, 2021, which is a continuation of U.S. patent application Ser. No. 16/912,295, entitled "REFRIGERANT LEAK MANAGEMENT SYSTEMS," filed Jun. 25, 2020, which is a continuation of U.S. patent application Ser. No. 16/182,287, entitled "REFRIGERANT LEAK MANAGEMENT SYSTEMS," filed Nov. 6, 2018, which claims priority to and the benefit of U.S. Provisional Application No. 62/752,181, entitled "REFRIGERANT LEAK MANAGEMENT SYSTEMS," filed Oct. 29, 2018, each of which is hereby incorporated by reference in its entirety for all purposes.

BACKGROUND

The present disclosure relates generally to heating, ventilation, and/or air conditioning (HVAC) systems, and more particularly to refrigerant leak detection and management for HVAC systems.

Residential, light commercial, commercial, and industrial HVAC systems are used to control temperatures and air quality in residences and buildings. Generally, the HVAC systems may circulate a refrigerant through a closed refrigerant circuit between an evaporator, where the refrigerant absorbs heat, and a condenser, where the refrigerant releases heat. The refrigerant flowing within the refrigerant circuit is generally formulated to undergo phase changes within the normal operating temperatures and pressures of the system so that quantities of heat can be exchanged by virtue of the latent heat of vaporization of the refrigerant. As such, the refrigerant flowing within an HVAC system travels through multiple conduits and components of the refrigerant circuit. Inasmuch as refrigerant leaks compromise system performance or result in increased costs, it is accordingly desirable to provide detection and response systems and methods for the HVAC system to reliably detect and respond to any refrigerant leaks of the HVAC system.

SUMMARY

In one embodiment of the present disclosure, a refrigerant leak management system includes a controller is configured to receive a signal indicative of a refrigerant pressure within a refrigerant circuit and determine whether the refrigerant pressure is indicative of a refrigerant leak in the refrigerant circuit. In response to determining that the refrigerant pressure is indicative of the refrigerant leak, the controller is configured to activate a fan configured to motivate air proximate the refrigerant circuit.

In another embodiment of the present disclosure, a heating, ventilation, and/or air conditioning (HVAC) system includes a leak detection device configured to be operably coupled to a refrigerant circuit of the HVAC system and configured to provide management signals in response to a change in a pressure of a refrigerant within the refrigerant circuit. The HVAC system also includes a fan configured to be operably coupled to the leak detection device and configured to motivate air proximate the refrigerant circuit. The leak detection device is configured to provide the management signals to control the fan to operate continuously in response to the change in the pressure.

In a further embodiment of the present disclosure, a heating, ventilation, and/or air conditioning (HVAC) system includes a refrigerant circuit configured to circulate a refrigerant therein and a controller. The HVAC system also includes a leak detection device communicatively coupled to the controller and fluidly coupled to the refrigerant circuit to sense a pressure of the refrigerant therein. Independent of compressor operation, the leak detection device or the controller is configured to activate a fan configured to provide air to an interior space configured to be climate managed by the HVAC system in response to the pressure being below a predefined threshold pressure.

Other features and advantages of the present application will be apparent from the following, more detailed description of the embodiments, taken in conjunction with the accompanying drawings which illustrate, by way of example, the principles of the application.

DETAILED DESCRIPTION

Figure 1:
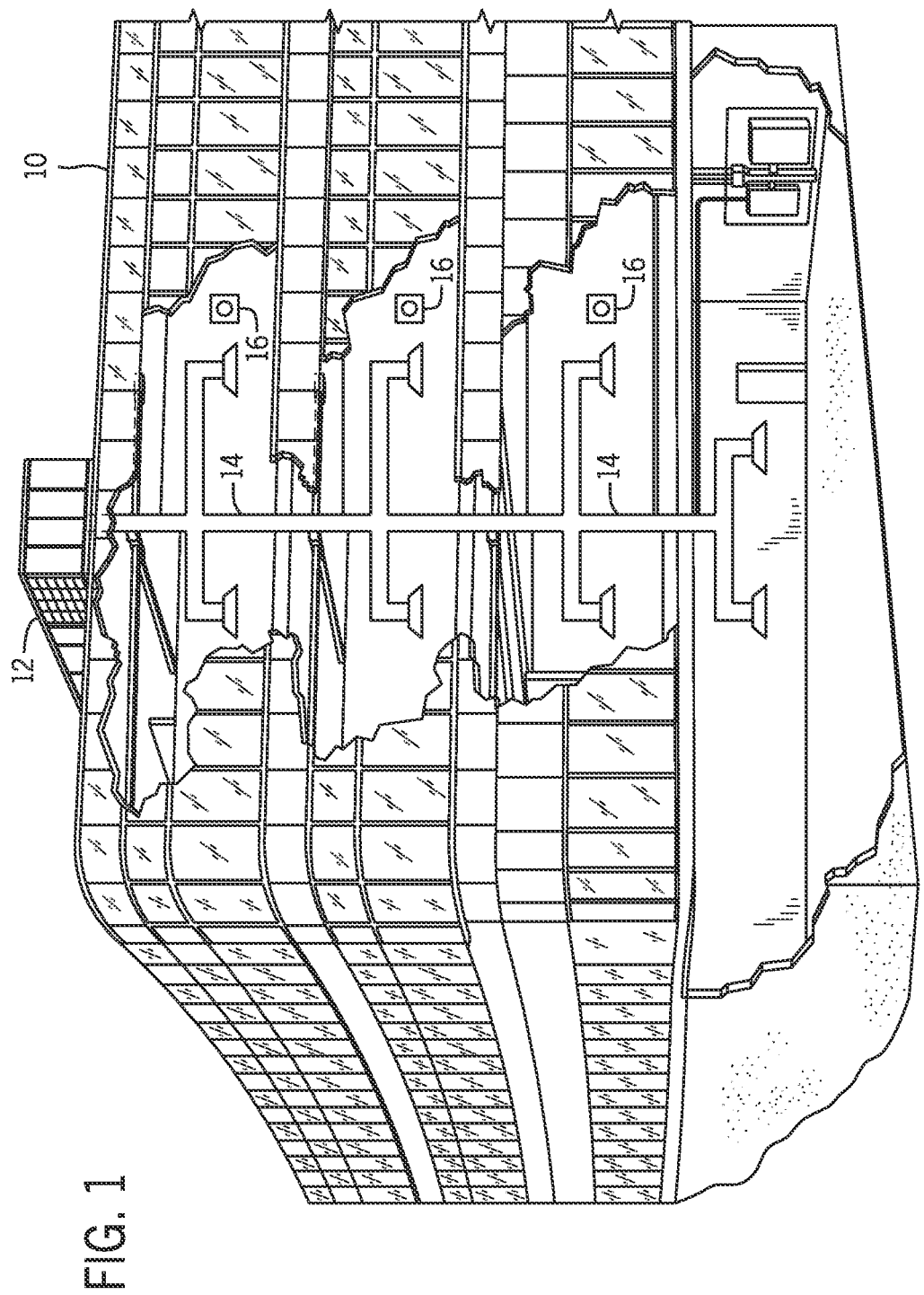
FIG. 1 is a perspective view of an embodiment of a commercial or industrial HVAC system, in accordance with an aspect of the present disclosure.

The present disclosure is directed to refrigerant leak detection and management for HVAC systems. As discussed above, to condition the interior space of a building, an HVAC system generally includes refrigerant flowing within a refrigerant circuit. However, the refrigerant may inadvertently leak from a flow path of the refrigerant circuit due to wear or degradation of components or imperfect joints or connections within the refrigerant circuit at some point after installation. Under certain conditions, leaking refrigerant vaporizes and distributes outward from a source of the leak, which can result in refrigerant-containing air accumulating, for example, within a casing of an HVAC unit, within the ductwork of the building, and/or within the conditioned interior space of the building. Additionally, traditional sensors that detect leaked refrigerant vapor within the conditioned interior space may be complicated or consumable devices, such as those that lose sensitivity over time, and which are only able to sense leaked refrigerant that is within a threshold distance of the traditional sensors. As such, multiple, strategically-placed sensors may be employed to monitor the conditioned interior space. Accordingly, the present techniques enable the HVAC system to reliably detect whether refrigerant is leaking from a refrigerant circuit, as well as manage any leaked refrigerant.

With the foregoing in mind, present embodiments are directed to a leak management system of an HVAC system. The leak management system includes a leak detection (LD) device or leak detection and management (LDM) device that is fluidly coupled to the refrigerant circuit to monitor an operating parameter of the refrigerant therein, and to activate in response to the operating parameter being indicative of a refrigerant leak. For example, the LDM device may include any suitable quantities of pressure switches and pressure transducers that monitor a refrigerant pressure of the refrigerant and activate in response to detecting a drop in the refrigerant pressure below a predefined threshold pressure. In response to the operating parameter being indicative of a refrigerant leak, the LDM device may send signals to operate a supply fan that provides air to interior space. As such, the leak management system causes circulation of the air within the conditioned interior space to dilute any leaked or pooled refrigerant and/or prevent pooling of refrigerant.

Moreover, the leak management system of certain embodiments activates auxiliary fans of an HVAC system, further improving circulation and dilution of any leaked refrigerant within the conditioned interior space. In some embodiments having a low pressure switch as part of the LDM device, the low pressure switch is able to directly activate the supply fan in response to a low pressure. In some embodiments having a pressure transducer as part of the LDM device, the pressure transducer is communicatively coupled to a suitable controller, such as an HVAC controller, to provide signals to the controller indicative of the refrigerant leak. Then, the controller can modify operation of the HVAC system in response to these signals. It should be noted that, in other embodiments, the LDM device may monitor a temperature, a flow rate, a fill level, or other parameter of the refrigerant circuit in addition or in alternative to monitoring pressure. Moreover, multiple pressure transducers and/or pressure switches are included in the LDM device of some embodiments to enable more granular detection of changes in refrigerant pressure and corresponding escalated control actions. In this manner, the disclosed techniques enable detection of refrigerant leaks within the HVAC system, and enable response via any combination of suitable control actions to address and manage the leaked refrigerant.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
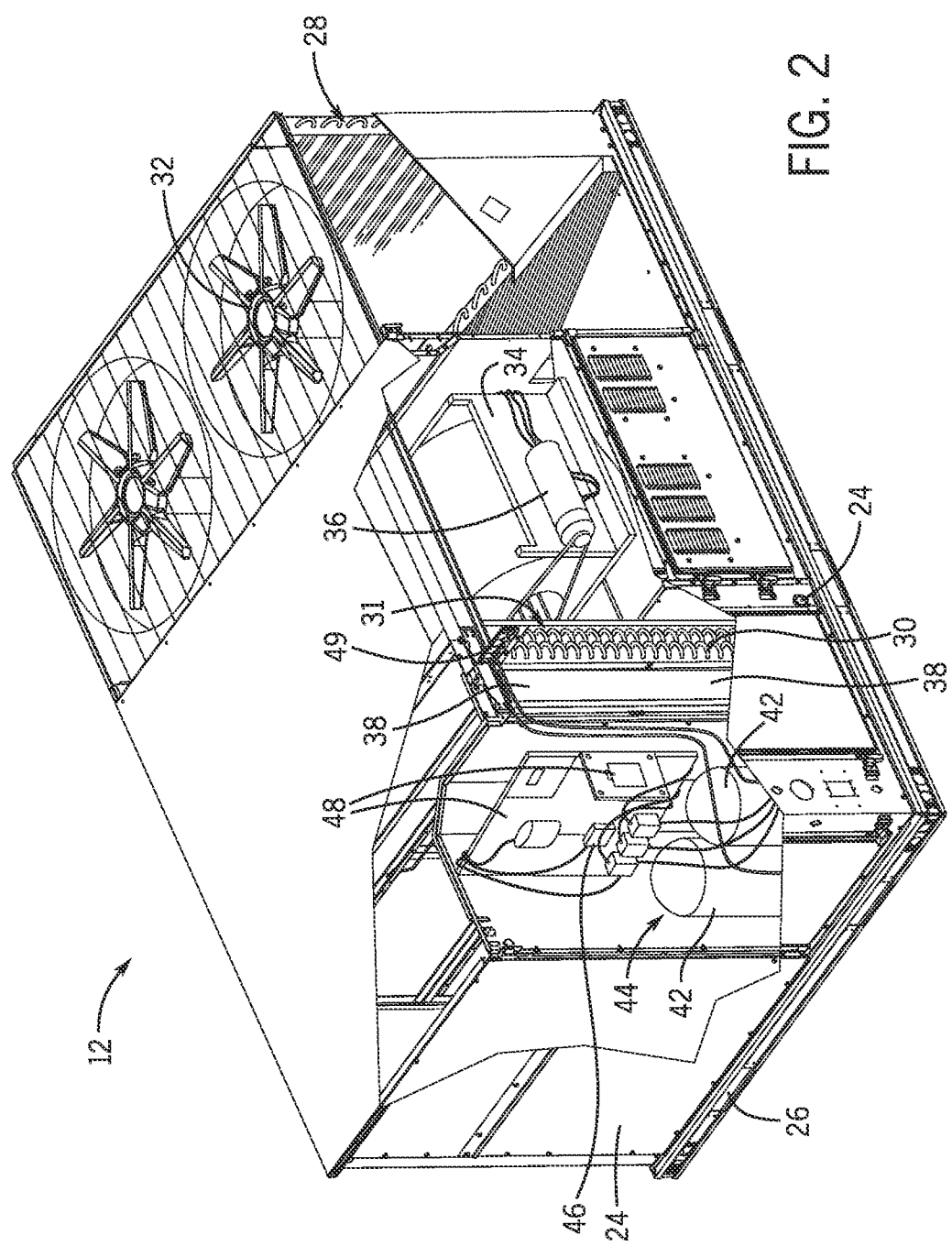
FIG. 2 is a perspective cutaway view of an embodiment of a packaged unit of an HVAC system, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
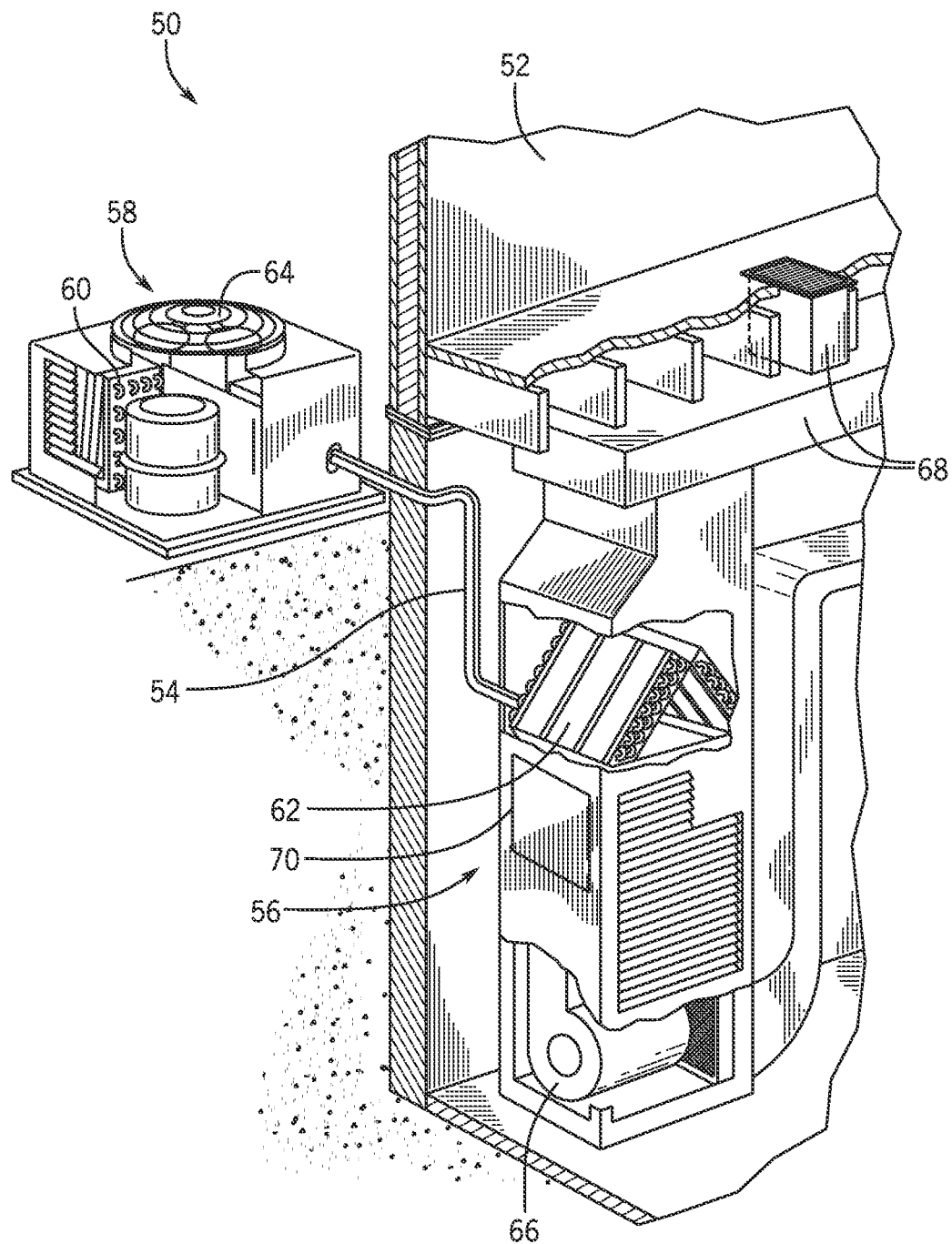
FIG. 3 is a perspective cutaway view of an embodiment of a split system of an HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
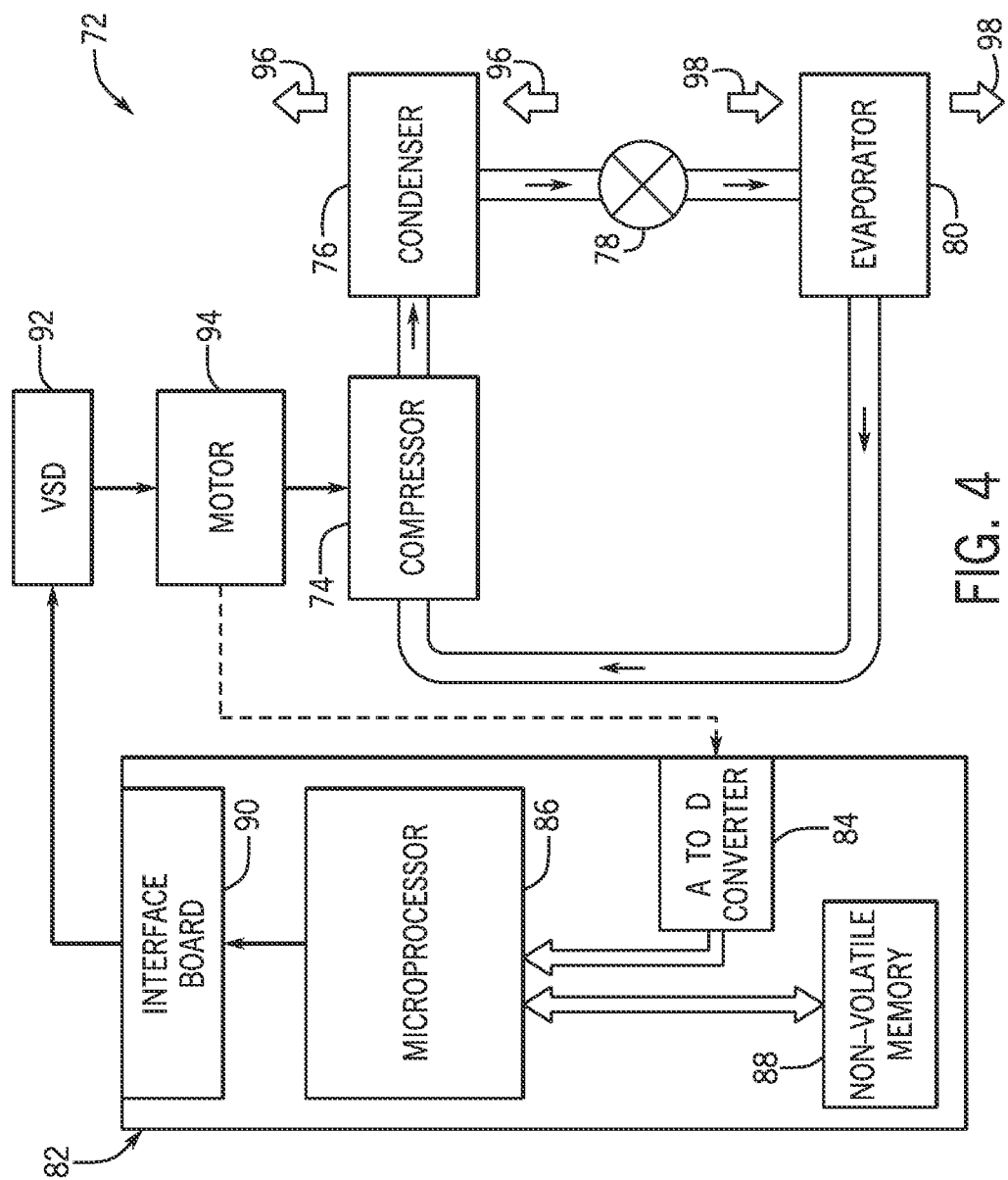
FIG. 4 is a schematic diagram of an embodiment of a vapor compression system of an HVAC system, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
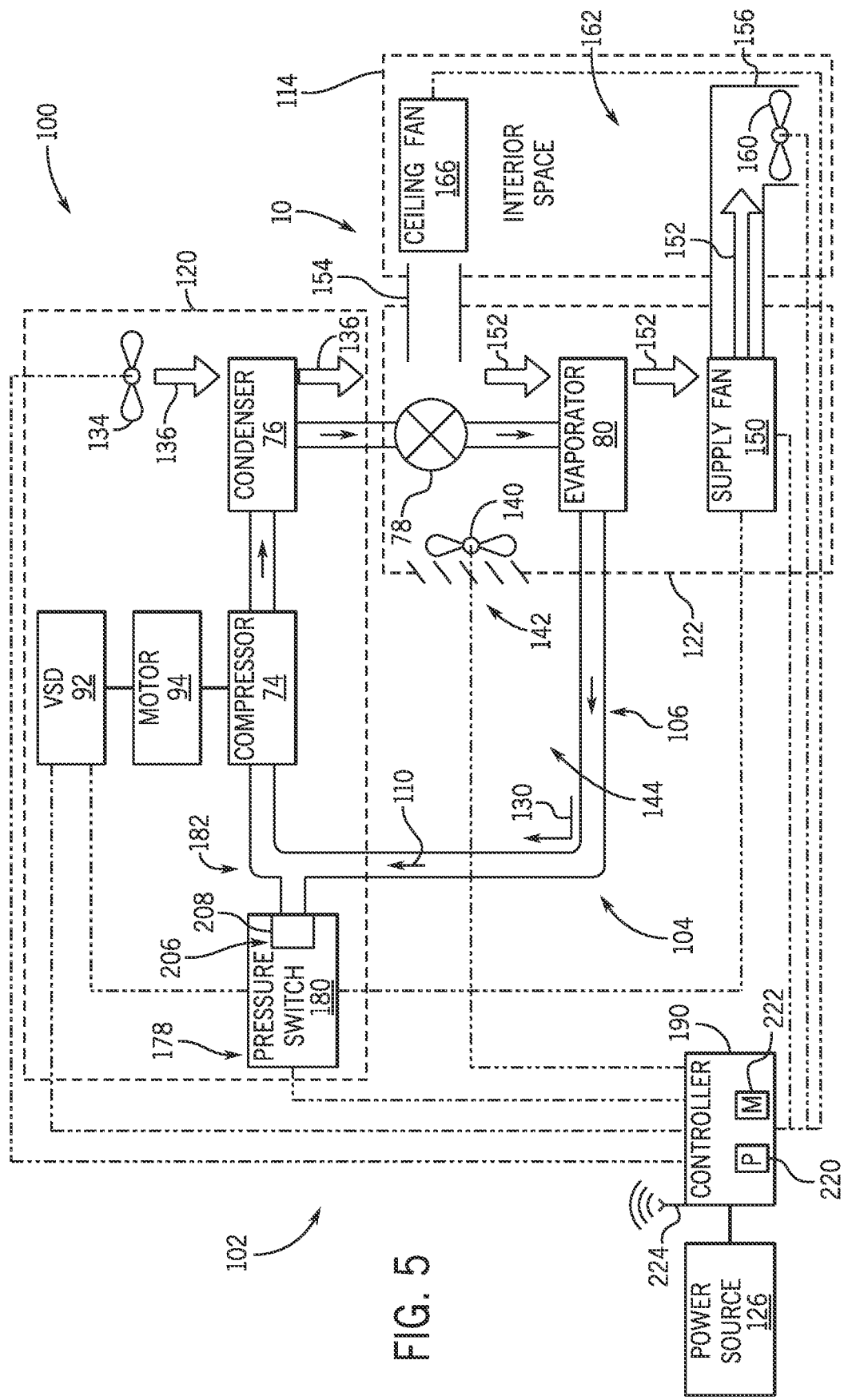
FIG. 5 is a schematic diagram of an embodiment of a leak management system of an HVAC system, in accordance with an aspect of the present disclosure.

FIG. 5 is a schematic diagram of an HVAC system 100 having a leak management system 102 for detecting and controlling leaked refrigerant within the HVAC system 100 and/or a building, such as the building 10 discussed above. As shown, the HVAC system 100 includes a refrigerant circuit 104 having conduits 106 that fluidly couple the evaporator 80, the compressor 74, the condenser 76, and the expansion device 78. A refrigerant 110 flows between HVAC components of the refrigerant circuit 104, undergoing phase changes that enable the HVAC system 100 to condition or climate manage an interior space 114 of the building 10. The refrigerant 110 may be any suitable refrigerant, such as R32, R1234ze, R1234yf, R-454A, R-454C, R-455A, R-447A, R-452B, R-454B, and the like. Each of the evaporator 80, the compressor 74, the condenser 76, and the expansion device 78 may correspond with any suitable HVAC devices discussed above with reference to FIGS. 1-4. Moreover, the evaporator 80, the compressor 74, the condenser 76, and the expansion device 78 may be part of any suitable residential refrigeration system, commercial refrigeration system, split refrigeration system, and/or single unit refrigeration system. As will be discussed in more detail below, the leak management system 102 is configured to detect a leak of the refrigerant 110 from the refrigerant circuit 104. In response to detection of a leak, the leak management system 102 is further enabled to provide suitable control signals or take suitable corrective actions to dilute or mitigate the leak of the refrigerant 110.

Looking first to the components of the HVAC system 100 that operate to condition an interior space 114 of the building 10, for the illustrated embodiment, the compressor 74 and the condenser 76 are disposed within an outdoor unit 120 or outdoor HVAC unit of the HVAC system 100, and the expansion device 78 and the evaporator 80 are disposed within an indoor unit 122 or indoor HVAC unit of the HVAC system 100. As discussed above, the compressor 74 may be driven by the motor 94, which is driven by the VSD 92. The VSD 92 regulates a magnitude of voltage and/or current supplied to the motor 94 from a power source 126, such as an AC or DC power source, to modify an operational speed of the compressor 74. During operation, the compressor 74 pressurizes a low pressure gas flow of the refrigerant 110 to yield a high pressure gas flow. The compressor 74 therefore provides energy to drive the refrigerant 110 along a refrigerant flow direction 130 through the refrigerant circuit 104 between the compressor 74, the condenser 76, the expansion device 78, and the evaporator 80. Moreover, an outdoor fan 134 of the HVAC system 100 is disposed adjacent to the condenser 76 to direct a flow of outside air 136 across the condenser 76, thereby enabling the high pressure gas flow of the refrigerant 110 traveling therethrough to release thermal energy to the outside air 136 and condense into a high pressure liquid refrigerant flow.

From the condenser 76, the high pressure liquid refrigerant 110 travels further along the conduits 106 to the indoor unit 122, where it passes through the expansion device 78 to expand the refrigerant 110 into a low pressure liquid flow. The refrigerant 110 then travels through the evaporator 80 to absorb thermal energy and vaporize into a low pressure gas flow, thereby completing the cycle. In the present embodiment, an economizer fan 140 is fluidly coupled to a damper opening 142 formed in a wall of the indoor unit 122. The economizer fan 140 may be activated to draw another flow of outside air from an external environment 144, through the damper opening 142, and into the indoor unit 122 as a source of fresh or ventilation air. In some embodiments, the damper opening 142 may include actuatable slats that may be adjusted to modify an amount of fresh, outside air drawn into the indoor unit 122. The indoor unit 122 further includes a supply fan 150 or indoor fan disposed adjacent to the evaporator 80 to direct a flow of indoor supply air 152 across the evaporator 80. As used herein, the supply fan 150 is therefore configured to move air proximate, or within inches or feet from, the refrigerant circuit 104. The indoor supply air 152 may include the outside air 136 drawn through the damper opening 142, as well as return air drawn through a return air duct 154 from the interior space 114, in some embodiments. When the compressor 74 is activated, active coils of the evaporator 80 cool and/or remove dissolved moisture, such as humidity, from the flow of indoor supply air 152 by enabling heat transfer between the refrigerant 110 and the flow of indoor supply air 152. When the compressor 74 is not activated and the supply fan 150 is operating, the supply fan 150 draws the unconditioned flow of indoor supply air 152 across inactive coils of the evaporator 80.

Whether the indoor supply air 152 is conditioned or unconditioned, the supply fan 150 directs the indoor supply air 152 along one or multiple ducts 156, such as the ductwork 14 illustrated in FIG. 1, to provide the supply air 152 to the interior space 114 of the building 10. In the present embodiment, a duct fan 160 is disposed within the duct 156 to further facilitate movement of the indoor supply air 152 into the interior space 114. The duct fan 160 may be any suitable fan capable of pushing or drawing the indoor supply air 152 into the interior space 114, such as a register boost fan, an inline duct fan, and so forth. In other embodiments, any suitable quantity of duct fans 160 may be provided in any suitable locations, such as within the ducts 156, within a threshold distance of the ducts 156, within a wall, ceiling, or floor of the interior space 114, and so forth. The indoor supply air 152 provided by the supply fan 150 generally circulates within the interior space 114, stirring room air 162 therein as well as moving a portion of the room air 162 out of the interior space 114 through imperfect seals between windows and doors, through the return air duct 154, and so forth. Moreover, a ceiling fan 166 is disposed within the interior space 114 of the present embodiment to provide further recirculation and movement of the room air 162 within the interior space 114. As noted herein, the ceiling fan 166, the duct fan 160, and the economizer fan 140 are each auxiliary fans that complement operation of the supply fan 150 to provide air dilution and mixing to the room air 162 within the interior space 114. In certain embodiments, the supply fan 150, the ceiling fan 166, the duct fan 160, and/or the economizer fan 140 are free of activation sources and/or are driven by motors that are free of activation sources, such as sparks. Moreover, the ceiling fan 166, the duct fan 160, and/or the economizer fan 140 may also be considered proximate the refrigerant circuit 104 in certain embodiments.

With the above understanding of the HVAC components, as noted herein and during normal operation, the HVAC system 100 of the present embodiment operates in one of an on-cycle, a vent-cycle, or an off-cycle. The on-cycle of the HVAC system 100 actively conditions the interior space 114 by conditioning the indoor supply air 152 via heat transfer with the refrigerant 110 within the refrigerant circuit 104 and providing the indoor supply air 152 to the interior space 114. That is, during the on-cycle, the compressor 74 is operating and the refrigerant 110 is flowing within the refrigerant circuit 104. During the vent-cycle, the supply fan 150 is activated, while the compressor 74 is deactivated. Operation in the vent-cycle thus directs the indoor supply air 152 along the ducts 156 and into the interior space 114 to provide ventilation and recirculation of air within the interior space 114, without providing active conditioning to the indoor supply air 152. Moreover, in the off-cycle, both the compressor 74 and the supply fan 150 are deactivated, and the interior space 114 is not actively conditioned.

Under normal operating conditions, a target amount of the refrigerant 110 is present within the refrigerant circuit 104 to enable proper operation of the HVAC system 100. Because the refrigerant circuit 104 is generally a pressurized, closed system in which the refrigerant 110 is desirably retained, the target amount of the refrigerant 110 includes a refrigerant pressure that is within a threshold range from a target refrigerant pressure. Under certain conditions, the refrigerant circuit 104 may develop an opening through which the refrigerant 110 may inadvertently flow or leak from the refrigerant circuit 104, causing the refrigerant pressure to fall beneath or deviate from the target refrigerant pressure. As presently recognized herein, monitoring a source of the refrigerant 110 via the leak management system 102 to monitor the refrigerant pressure, instead of or in addition to monitoring the interior space 114, enables more rapid detection of refrigerant leaks with a reduced dependence on complicated, insensitive, unreliable, and/or expendable refrigerant concentration sensors within the interior space 114.

Accordingly, to enable detection of a leak of the refrigerant 110 from the refrigerant circuit 104, the embodiment of the leak management system 102 illustrated in FIG. 5 includes a leak detection and management (LDM) device 178, which includes a pressure switch 180 or pressure multi-switch, in the illustrated embodiment. As noted herein, the LDM device 178 may be one of multiple suitable embodiments of a leak detection (LD) device, such as one having one or multiple signal-sending or management components. In some embodiments, a LD device that sends signals indicative of refrigerant pressure, which are subsequently utilized for management via other components of the leak management system 102, may be considered a LDM device. The pressure switch 180 of the LDM device 178 illustrated in FIG. 5 is fluidly coupled to the refrigerant circuit 104, such as a portion of the conduits 106 at a suction side 182 of the compressor 74. As used herein, the suction side 182 of the compressor 74 is downstream of the evaporator 80 relative to the refrigerant flow direction 130 of the refrigerant 110 and upstream of the compressor 74 relative to the refrigerant flow direction 130. In certain embodiments, the LDM device 178 of the leak management system 102 may include multiple pressure switches 180 fluidly coupled to other portions of the refrigerant circuit 104. For example, in an embodiment, the LDM device 178 may include a second pressure switch communicatively coupled to the evaporator 80 and a third pressure switch communicatively coupled to the condenser 76, which each may operate similarly to or different from the pressure switch 180. However, to illustrate the effective and straightforward operation thereof, the present discussion of the LDM device 178 will focus on operation of the embodiment having the single pressure switch 180. Further embodiments of the LDM device 178 with additional pressure-activated devices will be introduced below, with reference to FIG. 6.

In other embodiments, the pressure switch 180 of the LDM device 178 may be replaced or accompanied by any other pressure-activated device or hydraulic pressure sensing instrument. Indeed, as discussed below with reference to FIG. 6, any suitable number of pressure transducers may be used in place of or in addition to the pressure switch. In other embodiments, the LDM device 178 of the leak management system 102 may, additionally or alternatively, include other sensors suitable for detecting or enabling detecting of an amount, such as a mass or a volume, of the refrigerant 110 within the refrigerant circuit 104, or any other suitable operating parameter indicative of the amount of the refrigerant 110. For example, other embodiments of the LDM device 178 may include pressure sensors, temperature sensors, level sensors, acoustic sensors, flowrate sensors, and so forth. Moreover, as used herein, the term "sensor" may include any suitable instrument capable of acquiring feedback through direct or indirect observation indicators, such as feedback acquired from monitoring other features or components of the HVAC system 100.

Indeed, the LDM device 178 of the present embodiment is capable of monitoring a refrigerant pressure of the refrigerant 110 within the refrigerant circuit 104 to detect whether a refrigerant leak has occurred. For example and as discussed herein, the pressure switch 180 of the LDM device 178 actuates in response to a refrigerant pressure dropping below a predefined threshold pressure, which is indicative of a refrigerant leak. In some embodiments, the predefined threshold pressure may be set as or slightly above an ambient pressure outside the refrigerant circuit 104, such that a refrigerant pressure below the predefined threshold pressure indicates the refrigerant circuit 104 has equalized with an ambient environment in which the refrigerant circuit 104 is disposed. In some embodiments, the predefined threshold pressure is set as a pressure that corresponds to 80%, 70%, 60%, 50%, 40%, 30%, 20%, 10%, or less of the target refrigerant pressure of the refrigerant circuit 104. The leak management system 102 may be operated in various modes, including an active response mode to monitor for refrigerant leaks. The leak management system 102 may operate in active response mode during all operations of the HVAC system 100, such as while the HVAC system 100 is operating in the on-cycle, the vent-cycle, and the off-cycle.

In response to detecting a refrigerant leak of sufficient volume or magnitude, the leak management system 102 switches to a leak management mode or a controller-override mode to mitigate the refrigerant leak. In the present embodiment, the LDM device 178 operating in leak management mode activates the supply fan 150 to mitigate pooling of leaked refrigerant 110 within the interior space 114. That is, the pressure switch 180 selectively activates the supply fan 150 to direct the indoor supply air 152 into the interior space 114 when the refrigerant pressure within the conduit 106 falls beneath the predefined threshold pressure, thereby providing the indoor supply air 152 to the interior space 114. More particularly, when the refrigerant pressure falls beneath the predefined threshold pressure, the pressure switch 180 of the present embodiment provides a supply fan signal or management signal, such as an electrical current flowing between a controller 190 and the supply fan 150, and thus, activates the supply fan 150. As such, by activating the supply fan 150 that is proximate the refrigerant circuit 104, or any other suitable proximate auxiliary fans, it is recognized herein that refrigerant leaks from portions of the refrigerant circuit 104 to which the supply fan 150 is proximate may be more effectively diluted.

In the present embodiment, the pressure switch 180 of the LDM device 178 is also able to simultaneously block, interrupt, or override a compressor signal, such as an electrical current flowing between the controller 190 and the VSD 92 discussed above, to deactivate or prevent activation of the compressor 74. That is, upon detection of a refrigerant pressure indicative of a potential leak, the LDM device 178 of certain embodiments sends management signals that override normal operation of the compressor 74 to deactivate the compressor 74. It may be appreciated that, in certain embodiments, the supply fan signal and/or the compressor signal are electrical signals or management signals that respectively directly power the supply fan 150, the VSD 92, the motor 94, and/or the compressor 74. In other embodiments, the supply fan 150, the VSD 92, the motor 94, and/or the compressor 74 receive a separate supply of electrical power, and the supply fan signals and the compressor signals are data or instruction signals that trigger respective activation and operation of these components.

Further details regarding an example embodiment of the pressure switch 180 are discussed with reference to FIG. 7 below. For example, the illustrated pressure switch 180 of FIG. 5 includes a sensing portion 206 having a piston 208 disposed within a chamber that is fluidly coupled to a portion of the conduits 106. The piston 208 is configured to move longitudinally within the chamber to move one or multiple switching elements based on the refrigerant pressure. The sensing portion 206 may be calibrated, for example, using a spring element disposed above the piston 208, such that a magnitude of the predefined threshold pressure may be adjusted. In other embodiments, the pressure switch 180 may include any other suitable hydraulic pressure sensing instrument or pressure switch component that may be configured to move when the refrigerant pressure within the conduit 106 falls below the predefined threshold pressure.

As such, the leak management system 102 having the LDM device 178 with the pressure switch 180 is configured to detect and mitigate leaks, without reliance on control decisions from the controller 190 or sensors to monitor the interior space 114. Specifically, in response to a detected leak of the refrigerant 110, the pressure switch 180 may initiate or provide any suitable instructions or management signals that control the supply fan 150 to dilute or dissipate the leaked refrigerant within the interior space 114. In some embodiments, the controller 190 is omitted or not a component of the leak management system 102. In these embodiments, the pressure switch 180 may also be directly coupled to other components of the HVAC system 100 to perform additional control actions. The additional control actions of certain embodiments include activation of one or multiple additional response devices, such as an alarm, the economizer fan 140, the duct fan 160, the ceiling fan 166, the outdoor fan 134, and so forth. The pressure switch 180 may activate the supply fan 150 and/or perform the additional control actions for a predefined threshold time, until reset or deactivated by a technician, and so forth.

In some embodiments, the controller 190 is communicatively coupled to the pressure switch 180 and performs the control actions introduced above in response to detection of a refrigerant leak. In these embodiments, signals provided to the controller 190 by the LDM device 178 may be considered indications. Such embodiments may be advantageous to enable the leak management system 102 to monitor the refrigerant pressure over time, to reduce adjustments for retrofitting the leak management system 102 into existing HVAC systems, to coordinate timing of operations of the leak management system 102, and so forth. For example, as illustrated, the pressure switch 180 is communicatively coupled to the controller 190, which is the HVAC controller that governs operation of the entire HVAC system 100 in addition to, or in lieu of, the control panel 82. For example, the controller 190 is operatively coupled to the VSD 92, the outdoor fan 134, the economizer fan 140, the supply fan 150, the duct fan 160, and the ceiling fan 166 in the present embodiment by any suitable control transfer devices, such as wires, cables, wireless communication devices, and the like. Moreover, the controller 190 can be any device employing a general purpose or an application-specific processor 220, both of which may generally include memory 222 or suitable memory circuitry for storing instructions and/or data. However, in certain embodiments, the controller 190 may be a separate controller for controlling the leak management system 102 that is communicatively coupled to exchange data and/or instructions with an HVAC controller or another suitable master controller.

The processor 220 of the controller 190 illustrated in FIG. 5 may include one or more processing devices, and the memory 222 may include one or more tangible, non-transitory, machine-readable media collectively storing instructions executable by the processor 220 to control the leak management system 102 and/or the HVAC system 100. The processor 220 provides control signals to operate the leak management system 102 and the HVAC system 100 to perform the control actions disclosed herein. More specifically, as discussed below, the controller 190 receives input signals from various components of the HVAC system 100 and outputs control signals to control and communicate with various components in the HVAC system 100. The controller 190 may provide suitable control signals to control the flowrates, motor speeds, and valve positions, among other parameters, of the HVAC system 100.

Although the controller 190 is described as having the processor 220 and the memory 222, it should be noted that the controller 190 may include or be communicatively coupled to a number of other computer system components to enable the controller 190 to control the operations of the HVAC system 100 and the related components. For example, the controller 190 may include a communication component 224 that enables the controller 190 to communicate with other computing systems and electronic devices, such as alarm systems. The controller 190 may also include an input/output component that enables the controller 190 to interface with users via a graphical user interface or the like. In addition, the communication between the controller 190 and other components of the HVAC system 100 may be via a wireless connection, such as a connection through BLUETOOTH® Low Energy, ZIGBEE®, WIFI®, or may be a wired connection, such as a connection through Ethernet. In some embodiments, the controller 190 may include a distributed control system (DCS), a computer-based workstation, a laptop, a smartphone, a tablet, a personal computer, a human-machine interface, or the like. Additionally, the embodiments disclosed herein may be at least partially embodied using hardware implementations. For example, logic elements of the controller 190 may include a field-programmable gate array (FPGA) or other specific circuitry.

In some embodiments in which the controller 190 is part of the leak management system 102, and in contrast to embodiments in which the LDM device 178 operates by sending instructions without interacting with the controller 190, the controller 190 operates in an active response mode to receive input signals from the pressure switch 180 indicative of the refrigerant pressure within the refrigerant circuit 104. For example, the illustrated controller 190 may receive data indicating whether the pressure switch 180 is in a first position, in which the pressure switch 180 enables normal operation of the VSD 92 and the supply fan 150, or a second position, in which the pressure switch 180 blocks operation of the VSD 92 and activates the supply fan 150. In response to determining that the pressure switch 180 is in the second position, the controller 190 may determine that a refrigerant leak is present or is likely to be present, and may thus switch the leak management system 102 to leak management mode to perform any desired additional control actions. Moreover, in some embodiments, the controller 190 may determine that a refrigerant leak has occurred from a non-communicating embodiment of the pressure switch 180. For example, the controller 190 may determine that the pressure switch 180 is opened or actuated in response to instructing the VSD 92 to operate, while also sensing that power to the VSD 92 has been interrupted by the pressure switch 180.

In other embodiments in which the controller 190 is part of the leak management system 102, the controller 190 performs the aforementioned comparison of the refrigerant pressure to the predefined threshold pressure. That is, the controller 190 receives data indicative of the refrigerant pressure and compares the refrigerant pressure to the predefined threshold pressure discussed above. However, in contrast to being set by positioning physical components of the pressure switch 180, such as a spring, the threshold used by the controller 190 may be any suitable user-set, technician-set, or distributor-set value that is stored within the memory 222 of controller 190, either before or after the controller 190 is placed into operation within the HVAC system 100.

In certain embodiments, the controller 190 adjusts the predefined threshold pressure to which the refrigerant pressure is compared based on an operating parameter of the HVAC system 100. For example, the controller 190 may use a lower predefined threshold pressure during on-cycle operation of the HVAC system 100 in which the compressor 74 is activated. In some of these embodiments, the predefined threshold pressure may be adjusted based on the current operating speed of the compressor 74 or a velocity or flowrate of the refrigerant 110 measured by a flowrate sensor. Indeed, it is presently recognized that, because flowing, pressurized refrigerant generally has a lower pressure than a similar pressured refrigerant that is not flowing, adaption or adjustment of the predefined threshold pressure based on an operating condition of the refrigerant 110 may provide more rapid or accurate detection of refrigerant leaks. In some embodiments, the controller 190 may instead wait until on-cycle operation of the HVAC system 100 is concluded and thereafter determine the refrigerant pressure based on signals from the pressure switch 180 during the off-cycle of the HVAC system 100.

Figure 6:
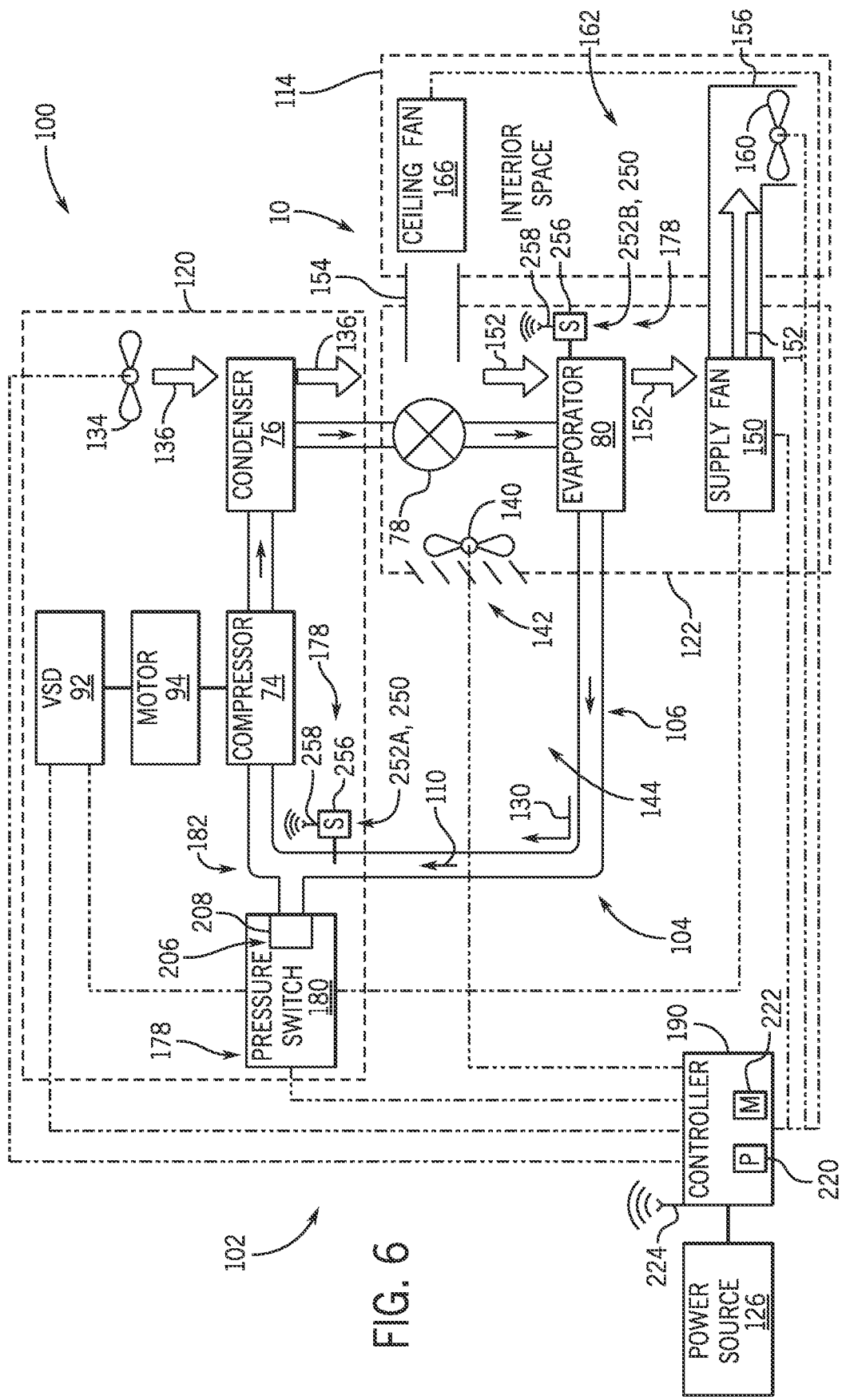
FIG. 6 is a schematic diagram of another embodiment of the leak management system, in accordance with an aspect of the present disclosure.

FIG. 6 is a schematic diagram of an embodiment of the leak management system 102 in which the LDM device 178 includes multiple pressure-activated devices 250 to monitor the refrigerant circuit 104 for refrigerant leaks therefrom. In addition to the pressure switch 180 discussed above, the LDM device 178 includes pressure transducers 252 fluidly coupled to the refrigerant circuit 104. For example, the pressure-activated devices 250 of the illustrated embodiment include a first pressure transducer 252A fluidly coupled to an interior of the conduit 106 at the suction side 182 of the compressor 74 and a second pressure transducer 252B fluidly coupled to an interior of the evaporator 80. The pressure transducers 252 include a sensing portion 256 fluidly coupled to the refrigerant circuit 104 to sense the refrigerant pressure therein, as well as a communication component 258 that is wirelessly communicatively coupled to the controller 190. In other embodiments, the pressure transducers 252 may be physically coupled to the controller 190 by any other control transfer devices. The pressure transducers 252 may therefore provide signals indicative of the refrigerant pressure to the controller 190 at any suitable rate, such as at a regular interval, upon sensing a change in the refrigerant pressure, and so forth. In other embodiments, the LDM device 178 may include one or multiple pressure transducers 252 while lacking pressure switches 180.

As recognized herein, use of the pressure transducers 252 within the LDM device 178 enables the controller 190 to receive additional information and perform more complex control actions than embodiments of the leak management system 102 having the one pressure switch 180 and lacking pressure transducers 252. As discussed in more detail with reference to FIG. 5, during normal operation of the HVAC system 100 when a refrigerant leak is not present, the refrigerant 110 has a refrigerant pressure that is within or above the predefined threshold pressure. During the normal operation, the pressure transducers 252 therefore provide signals indicative of the refrigerant pressure to the controller 190, which determines that a refrigerant leak is not present and continues normal operation of the HVAC system 100 to condition the interior space 114 to desired conditions. In some embodiments, the pressure transducers 252 only provide signals in response to a leak condition. Under conditions in which the pressure transducers 252 transmit signals indicative of a refrigerant leak, such as a refrigerant pressure below the predefined threshold pressure, the controller 190 determines that a refrigerant leak is occurring or has occurred, and the leak management system 102 changes its operation from active response mode to leak management mode. Indeed, as discussed above, the controller 190 activates the supply fan 150 to direct the indoor supply air 152 into the interior space 114.

In certain embodiments, the controller 190 performs additional or escalated control actions in response to determining that the refrigerant pressure is beneath a secondary predefined threshold pressure, lower than the predefined threshold pressure. The predefined threshold pressure discussed above may be referred to as a primary predefined threshold pressure in these embodiments. In some of these embodiments, the secondary predefined threshold pressure may be selected to correspond to a refrigerant pressure indicative of a majority or a significant portion of the refrigerant 110 having leaked from the refrigerant circuit 104. As such, to address the additional amount of the refrigerant 110 that has leaked from the refrigerant circuit 104, the escalated control actions of certain embodiments include activating one or multiple of the economizer fan 140, the duct fan 160, the ceiling fan 166, and so forth. Further, the escalated control actions of certain embodiments includes deactivating the compressor 74, such that the HVAC system 100 is either moved to or confined to off-cycle operations that do not actively condition the indoor supply air 152 provided to the interior space 114. Accordingly, the refrigerant 110 is not further distributed from the refrigerant circuit 104 by operation of the compressor 74, and the HVAC components are protected from wear that may otherwise occur during operation with insufficient levels of refrigerant 110. In this manner, additional refrigerant leakage from the refrigerant circuit 104 is also mitigated. It is to be understood that the controller 190 may perform each of these escalated control actions as regular control actions in some embodiments, such that the actions are performed in response to determining that the refrigerant pressure is below the primary predefined refrigerant threshold.

Moreover, the controller 190 of certain embodiments coordinates operation of the pressure transducers 252 with the pressure switch 180, which is operatively coupled to the controller 190. As such, the leak management system 102 may distribute or duplicate any suitable operations between the pressure switch 180, the pressure transducers 252, and the controller 190. For example, the pressure switch 180 of the present embodiment may be responsible for deactivating the compressor 74 and activating the supply fan 150 and the duct fan 160, while the controller 190 may be responsible for activating the economizer fan 140, activating the ceiling fan 166, transmitting alerts to a user interface or computing device, and so forth.

Figure 7:
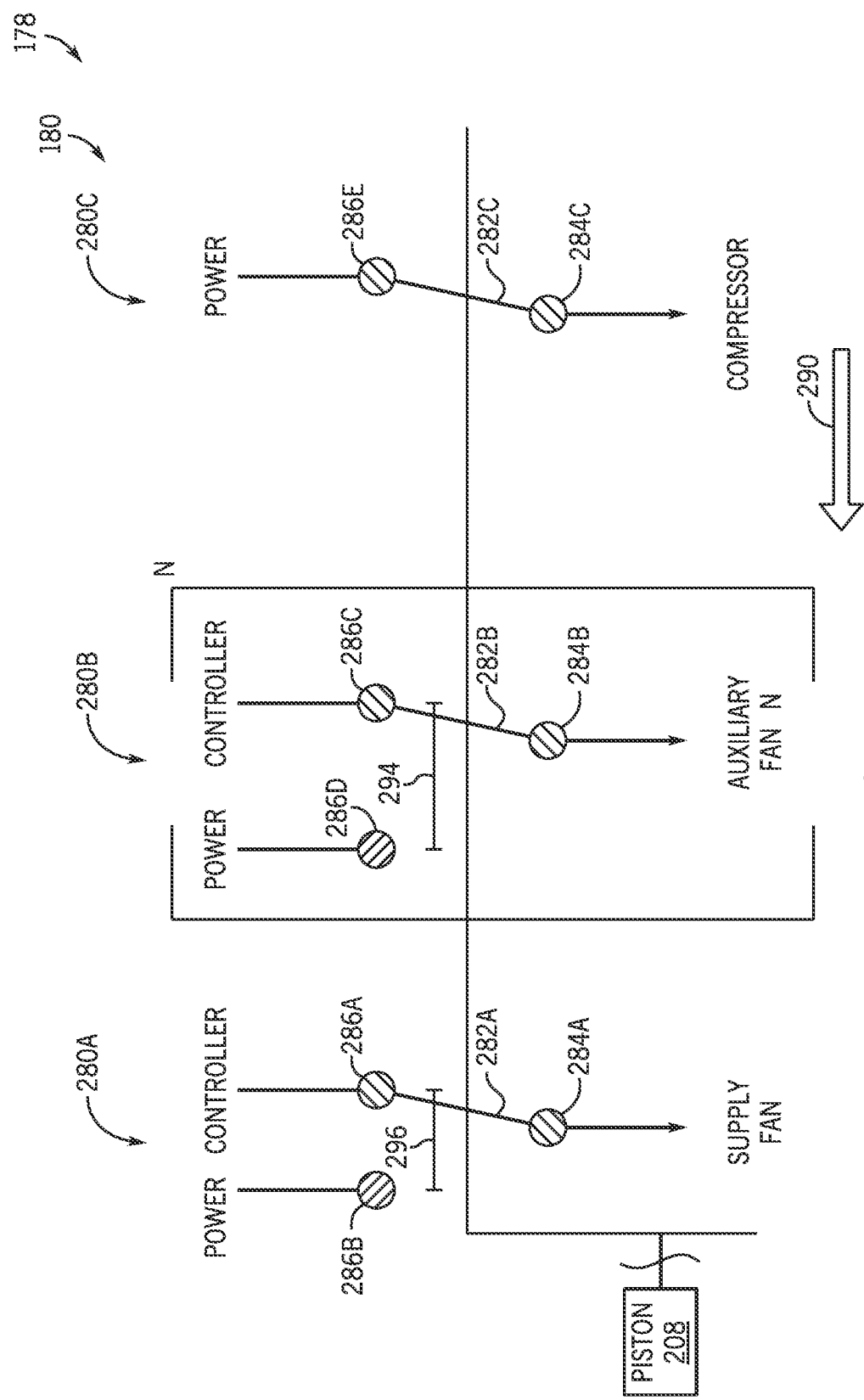
FIG. 7 is a schematic diagram of an embodiment of a pressure switch of a leak detection and management (LDM) device, in accordance with an aspect of the present disclosure.

FIG. 7 is a schematic diagram of an embodiment of the pressure switch 180 of the LDM device 178 having multiple switch portions 280. For example, in the illustrated embodiment, the pressure switch 180 includes a supply fan switch portion 280A, one or more than one auxiliary fan switch portions 280B, and a compressor switch portion 280C. Generally, the switch portions 280 control whether certain components of the HVAC system 100, such as the supply fan 150, ceiling fans 166, the duct fan 160, the economizer fan 140, and/or the compressor 74, are able to continue receiving control signals from the controller 190, or whether these components instead receive an override control signal via the pressure switch 180 in response to a low refrigerant pressure condition within the HVAC system 100. As such, in certain embodiments, the pressure switch 180 is responsive to a refrigerant leak condition to operate as a physical override or interrupt device that is configured to operate or override control of certain components of the HVAC system 100. It may be appreciated that, in other embodiments, the LDM device 178 may instead be implemented as multiple, independent switching devices that collectively operate to provide the disclosed physical override or interrupt device functionality.

For the embodiment illustrated in FIG. 7, to manage these control signals, the switch portions 280 include switching elements 282 or management components, such as switching elements 282A, 282B, 282C, that are operatively coupled to corresponding output contacts 284, such as output contacts 284A, 284B, 284C, and are moveable between one or multiple corresponding input contacts 286, such as input contacts 286A, 286B, 286C, 286D, 286E. It is to be understood that components are operatively coupled in any suitable manner to provide any suitable control signals including communication and/or power signals that enable the corresponding components to perform their intended operations. For example, the switching elements 282 may be moveable by the piston 208 of the sensing portion 206 or multiple pistons in response to pressure fluctuations of the refrigerant 110 within the refrigerant circuit 104, as illustrated in FIGS. 5 and 6. For example, the piston 208 of certain embodiments is disposed within a chamber that is fluidly coupled to a portion of the conduits 106. The piston 208 is then able to move longitudinally along direction 290 within the chamber in response to dropping refrigerant pressure. As such, the switching elements 282 move relative to the input contacts 286 based on the drop in refrigerant pressure, as indicated in FIG. 7. Thus, should the refrigerant pressure within a portion of the HVAC system 100 fall beneath a respective predefined threshold pressure, the piston 208 moves the switching elements 282 to respective leak response orientations or positions. Indeed, the illustrated embodiments of the switching elements 282 move with the piston 208 in the direction 290 as the refrigerant pressure drops. In other embodiments, any suitable number of any suitable actuating and/or switching components may be employed.

For example, in the illustrated embodiment, the supply fan switch portion 280A includes output contact 284A that is coupled to controller input contact 286A by switching element 282A at normal refrigerant pressures. When in the illustrated closed configuration, the controller 190 is capable of providing control signals to the supply fan 150 through the supply fan switch portion 280A. The supply fan switch portion 280A also includes override input contact 286B that, when coupled to the output contact 284A, interrupts control of the supply fan 150 by the controller 190 and instead instructs the supply fan 150 to operate at high or maximum speed, regardless of any control signals provided by the controller 190. In response to the refrigerant pressure falling beneath a specified predefined pressure threshold, which results in the switching element 282A being shifted in the direction 290, the switching element 282A is moved to a leak management configuration, wherein the output contact 284A and the override input contact 286B are electrically and operatively coupled. Thus, the pressure switch 180 can override the controller 190 and reflexively activate the supply fan 150 or provide management signals to instruct the supply fan 150 to continuously operate at a maximum capacity to mitigate the accumulation of refrigerant vapor as a result of the sensed refrigerant leak.

Similarly, the auxiliary fan switch portion 280B includes output contact 284B that is selectively coupled to controller input contact 286C or override input contact 286D by switching element 282B based on the refrigerant pressure. As indicated by the exponential N, the pressure switch 180 of certain embodiments includes multiple auxiliary fan switch portions 280B, such as one for each of the auxiliary fans discussed above. In other embodiments, more than one of the aforementioned fans may be collectively controlled by one auxiliary fan switch portion 280B. Moreover, for the illustrated embodiment, a distance 294 between the controller input contact 286C and the override input contact 286D, which may represent a first switching element travel distance, is longer than a distance 296 between the controller input contact 286A and the override input contact 286B of the supply fan switch portion 280A, which may represent a second switching element travel distance. As such, the auxiliary fans coupled to the output contact 284B are activated by the pressure switch 180 at a lower predefined refrigerant pressure threshold than the predefined refrigerant pressure threshold of the supply fan switch portion 280A. As such, it is presently recognized that the disclosed pressure switch 180 enables targeted, staged, or escalated control actions in response to detected leaks of greater magnitudes, though in other embodiments, any suitable predefined refrigerant pressure threshold may be selected.

Further, the illustrated embodiment of the compressor switch portion 280C includes output contact 284C that is coupled to power input contact 286E by switching element 282C to provide operational power to the compressor 74 which sufficiently high refrigerant pressures exist within the HVAC system 100. As such, during operation of the HVAC system 100, the compressor 74 is driven by the VSD 92 and the motor 94 discussed above. However, in response to a refrigerant pressure that is below a respective predefined refrigerant pressure threshold, the switching element 282C disconnects from the power input contact 286E, which interrupts control signals, such as communication signals and/or power signals, to the compressor 74. In some embodiments, the switching element 282C actuates upon the refrigerant pressure reaching the predefined refrigerant pressure thresholds of the other switching portions 280A, 280B, or alternatively, a different, higher, and/or lower predefined threshold pressure based on a travel distance of the switching element 282C to disconnect from the power input contact 286E.

Figure 8:
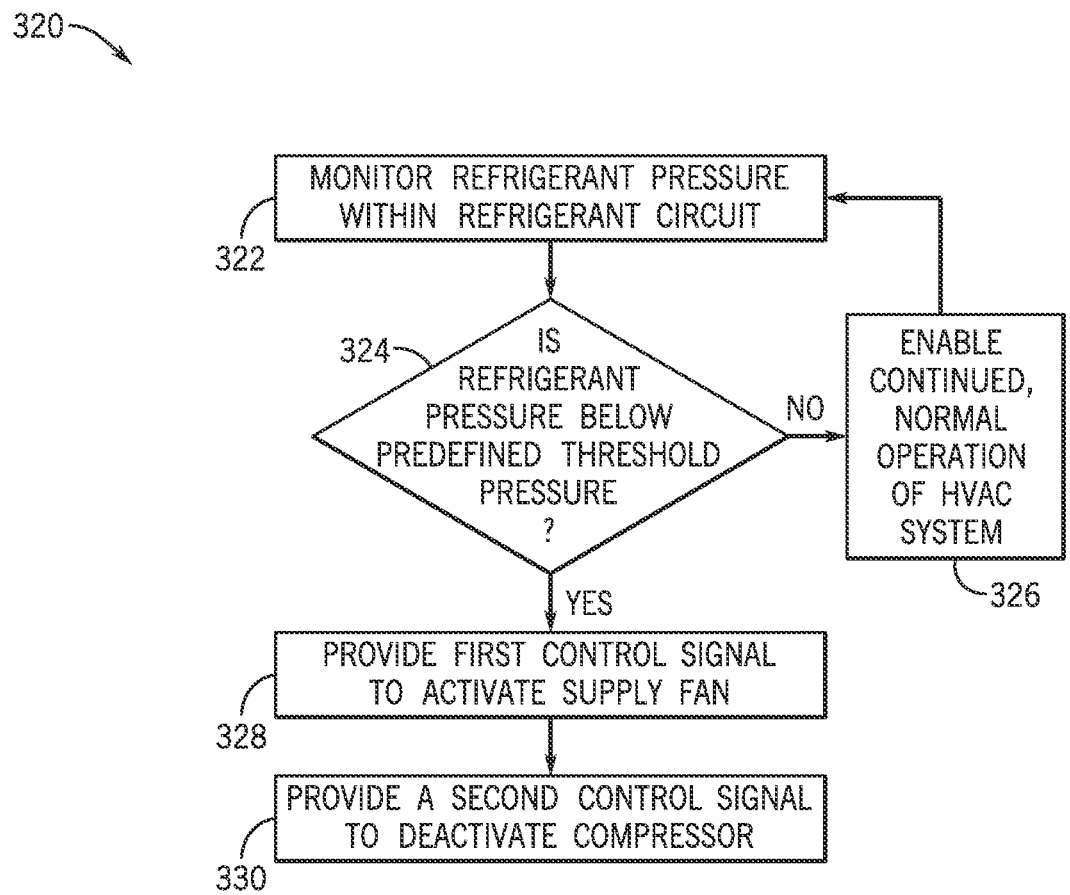
FIG. 8 is a flow diagram representing an embodiment of a process of operating the leak management system of FIG. 5, in accordance with an aspect of the present disclosure.

With the foregoing in mind, FIG. 8 is an embodiment of a process 320 of operating the leak management system 102 of FIG. 6. It is to be understood that the steps discussed herein are merely exemplary, and certain steps may be omitted or performed in a different order than the order discussed herein. In some embodiments, the process 320 may be performed by the processor 220 of the controller 190, which may be an HVAC controller or a separate controller that is communicatively coupled to the HVAC controller. Additionally, although the process 320 is discussed with reference to the LDM device 178 having the pressure switch 180 and the pressure transducers 252, it is to be understood that the present techniques may be extended to operate based on operation of any suitable LDM device 178 of any suitable leak management system 102, including the LDM device 178 of FIG. 5 having the one pressure switch 180.

To begin the illustrated process 320, the controller 190 monitors, at step 322, the refrigerant pressure within the refrigerant circuit 104. As discussed above, the pressure switch 180 and the pressure transducers 252 include respective sensing portions 206, 256 that are fluidly coupled to the interior of the refrigerant circuit 104 to measure and provide signals or indications indicative of the refrigerant pressure therein. Thus, based on the signals from the LDM device 178, the controller 190 is able to determine, at step 324, whether the refrigerant pressure is below the predefined threshold pressure. Indeed, as discussed above, the predefined threshold pressure is set as any suitable pressure threshold for the refrigerant below which a leak from the refrigerant circuit 104 is likely to have occurred. Moreover, in some embodiments, the controller 190 is configured to determine whether a refrigerant leak has occurred based on input from additional components of the HVAC system 100, such as the VSD 92. For example, in embodiments in which the controller 190 is instructing the VSD 92 to operate and the pressure switch 180 has interrupted power supplied to the VSD 92, the controller 190 may determine that the pressure switch 180 has likely actuated in response to a low refrigerant pressure condition, indicating that a refrigerant leak is present.

In response to determining that the refrigerant pressure is at or above the predefined threshold pressure value, the controller 190 enables, at step 326, continued, normal operation of the HVAC system 100. That is, the controller 190 determines a leak has not occurred and continues to operate the compressor 74, the supply fan 150, and any other suitable components of the HVAC system 100 to provide desired conditioning to the interior space 114. Thus, the leak management system 102 continues to operate in active response mode to monitor the refrigerant pressure based on input from the pressure switch 180. The controller 190 following the process 320 therefore returns to step 322 to continue monitoring the refrigerant pressure. In some embodiments, the controller 190 may also wait a predefined time threshold before determining the pressure of the refrigerant 110 again, thus reducing usage of computing power of the controller 190. In certain embodiments, the predefined time threshold is set as 1 minute, 5 minutes, 10 minutes, 60 minutes, or more.

In response to determining that the refrigerant pressure is below the predefined threshold pressure, the controller 190 provides, at step 328, a first control signal to activate the supply fan 150. That is, the controller 190 determines that a refrigerant leak from the refrigerant circuit 104 has occurred. Thus, to perform suitable control actions or corrective actions for managing the detected leak of the refrigerant 110, the leak management system 102 enters leak management mode, in which the supply fan 150 is activated to promote dilution of any refrigerant 110 within the indoor supply air 152 of the interior space 114. For example, the controller 190 may provide the supply fan signal to the supply fan 150 to cause the supply fan 150 to motivate the flow of the indoor supply air 152 into the interior space 114. As such, pooling of the refrigerant within the interior space 114 may be mitigated or prevented by circulation and dilution via the indoor supply air 152.

The controller 190 following the present embodiment of the process 320 additionally provides, at step 330, a second control signal to deactivate the compressor 74. That is, the controller 190 may turn the compressor 74 off if the compressor 74 was operating during the determination of step 324 and may prevent subsequent operation of the compressor 74. In these embodiments, the indoor supply air 152 motivated into the interior space 114 by the supply fan 150 is unconditioned. In some embodiments, the controller 190 provides the second control signal in response to the LDM device 178 detecting a refrigerant pressure equal to a second predefined refrigerant pressure, lower than the predefined refrigerant pressure. It is to be understood that step 328 and step 330 may be performed simultaneously, in some embodiments, or step 330 may be omitted in some embodiments. In some embodiments, the controller 190 monitors a change of the refrigerant pressure over time to monitor a rate or speed at which the refrigerant pressure is changing. For example, based on signals from the pressure transducers 252, the controller 190 of certain embodiments determines whether the refrigerant pressure is dropping or has a rate of change that is greater than a predefined threshold rate of change. The predefined threshold rate of change may be any suitable pressure change over time, such as 1 pound per square inch (psi) per minute, 1 psi per hour, 1 psi per day, and so forth. As such, the controller 190 is capable of preemptively identifying refrigerant leaks and performing control actions before the refrigerant pressure falls below the predefined threshold pressure, in some embodiments. In response to determining that the refrigerant pressure has a rate of change that is greater than the predefined threshold rate of change, the controller 190 performs any of the control actions discussed herein.

Moreover, the controller 190 may proceed to perform any other suitable control actions to mitigate pooled or leaked refrigerant, such as activating other components of the HVAC system 100. In some embodiments, the controller 190 additionally activates the economizer fan 140 or adjusts a position of actuatable slats of the damper opening 142 to provide a greater amount of fresh air into the indoor supply air 152 supplied to the indoor unit 122 and the interior space 114. The controller 190 may also activate the duct fan 160 and/or the ceiling fan 166 to provide additional mixing of the indoor supply air 152. As such, any collections or pools of the refrigerant 110 within the interior space 114 are mitigated and/or removed from the interior space 114. Accordingly, the controller 190 in communication with the LDM device 178 of the leak management system 102 may detect refrigerant leaks and mitigate pooling of the refrigerant within the interior space 114 by dilution, circulation, and/or removal.

Figure 9:
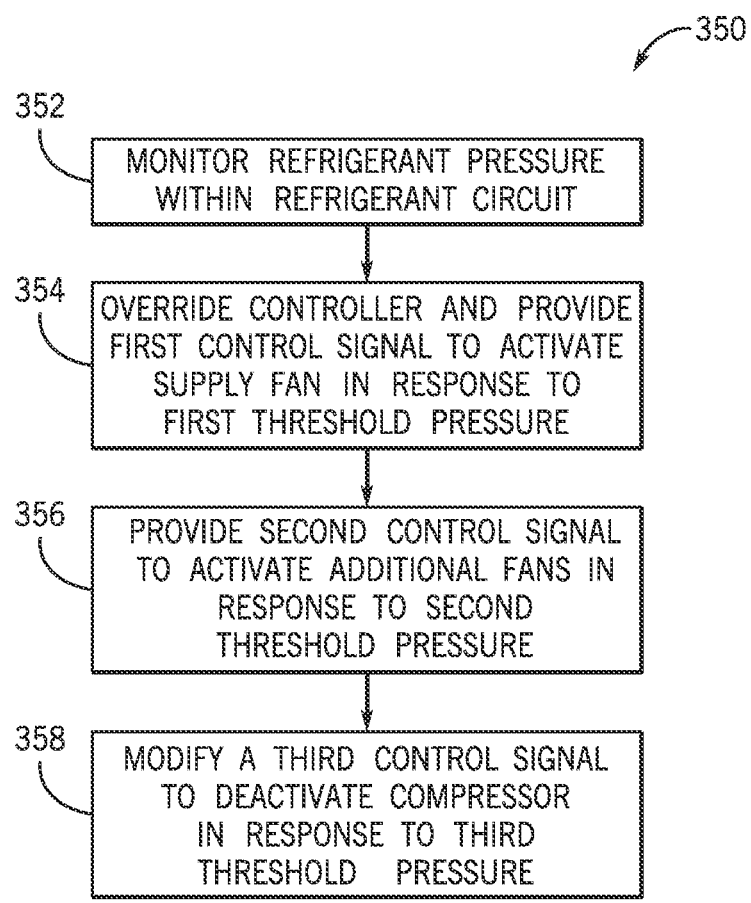
FIG. 9 is a flow diagram representing an embodiment of a process of operating the LDM device of FIG. 7, in accordance with an aspect of the present disclosure.

FIG. 9 is an embodiment of a process 350 of operating the leak management system 102 of FIG. 5. It is to be understood that the steps discussed herein are merely exemplary, and certain steps may be omitted or performed in a different order than the order discussed herein. In the present embodiment, the process 350 is performed via the LDM device 178 having the one pressure switch 180 that operates as an interrupt or override device. In other embodiments, the present techniques may be extended to operate based on any suitable LDM device 178 of any suitable leak management system 102, including the LDM device 178 of FIG. 6 having the pressure transducers 252 as well.

To begin the illustrated process 350, the pressure switch 180 of the LDM device 178 monitors, at step 352, the refrigerant pressure within the refrigerant circuit 104. As discussed above, the sensing portion 206 of the pressure switch 180 is fluidly coupled to the conduits 106 at the suction side 182 of the compressor 74 to hydraulically sense the refrigerant pressure therein. The pressure switch 180 enables control or power signals to traverse the pressure switch 180 throughout normal operating conditions of the HVAC system 100, such as those without leak conditions. Indeed, when the pressure switch 180 is not actuated, the HVAC system 100 operates normally to provide control signals to the supply fan 150, the compressor 74, and so forth.

In response to the refrigerant pressure dropping to a first threshold pressure, the pressure switch 180 overrides, at step 354, the controller 190 to provide a first control signal to activate the supply fan 150 by transmitting instructions thereto. As discussed above with reference to FIG. 7, the switching element 282A or any suitable management component of the supply fan switch portion 280A is moved from the controller input contact 286A to the override input contact 286B, thus instructing or signaling the supply fan 150 to operate continuously in leak management mode to promote dilution of any refrigerant leaks within the interior space 114.

In response to the refrigerant pressure dropping to a second threshold pressure, which may be below the first threshold pressure, the pressure switch 180 provides, at step 356, a second control signal to control signal to activate additional or auxiliary fans. Indeed, as discussed with respect to FIG. 7, the switching element 282B of the auxiliary fan switch portion 280B similarly moves from the controller input contact 286C to the override input contact 286D in response to the continued refrigerant pressure decrease. As such, the additional or auxiliary fans coupled to the output contact 284B are instructed to operate in leak management mode, such as in an always on and/or maximum speed setting, to further facilitate dilution of any refrigerant leaks.

In response to the refrigerant pressure dropping to a third threshold pressure, which may be below the first and/or second threshold pressure, the pressure switch 180 modifies, at step 358, a third control signal to deactivate the compressor 74. The switching element 282C of the compressor switch portion 280C may therefore disconnect from the power input contact 286E to interrupt power flow between the power source 126 and the compressor 74. In such embodiments, the indoor supply air 152 provided to the interior space 114 by the supply fan 150 is unconditioned. It is to be understood that each of the first, second, and third threshold pressures may be individually selected to enable the pressure switch 180 of the LDM device 178 to implement control actions to mitigate refrigerant leaks in any suitable order. Accordingly, the LDM device 178 having the pressure switch 180 provides efficient monitoring and management of refrigerant leaks from the refrigerant circuit 104 based on the refrigerant pressure within the refrigerant circuit 104.

Accordingly, embodiments discussed herein are directed to a refrigerant leak management system having a LD device or LDM device that includes one or multiple pressure-activated devices fluidly coupled to a refrigerant circuit. The pressure-activated devices include pressure switches, pressure transducers, or a combination thereof in some embodiments. By monitoring a source of the refrigerant, the LDM device reduces a demand for complicated, insensitive, unreliable, and/or expendable refrigerant concentration sensors disposed within an interior space. In response to detecting or determining that the refrigerant pressure is indicative of a refrigerant leak, the LDM device or the controller activates a supply fan that is configured to provide conditioned air to the interior space. Additionally, the LDM device and/or the controller deactivates the compressor, in some embodiments, so that additional refrigerant is not driven through the refrigerant circuit and potentially leaked out of the refrigerant circuit. Thus, the unconditioned, ventilation air provided to the interior space dilutes and circulates the air within the interior space to stop or prevent undesired pooling of the refrigerant within the interior space. In some embodiments, the LDM device or the controller activates additional fans within or fluidly coupled to the interior space to provide further mixing and dilution of the refrigerant therein. By these and any other suitable manners, the refrigerant leak management system may improve operation of the HVAC system, while enabling the detection and mitigation of refrigerant leaks.

While only certain features and embodiments of the present disclosure have been illustrated and described, many modifications and changes may occur to those skilled in the art, such as variations in sizes, dimensions, structures, shapes and proportions of the various elements, values of parameters, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the present disclosure. Furthermore, in an effort to provide a concise description of the exemplary embodiments, all features of an actual implementation may not have been described, such as those unrelated to the presently contemplated best mode of carrying out the present disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and/or air conditioning (HVAC) system, comprising:
 a refrigerant circuit;
 a compressor configured to circulate a refrigerant through the refrigerant circuit;
 a first leak detection and management (LDM) device disposed in a first location of the refrigerant circuit and configured to detect a pressure of the refrigerant at the first location;
 a second LDM device disposed in a second location of the refrigerant circuit and configured to detect a pressure of the refrigerant at the second location; and
 a controller configured to disable the compressor in response to:
  a first signal from the first LDM device, the first signal indicating a first refrigerant leak at the first location; or
  a second signal from the second LDM device, the second signal indicating a second refrigerant leak at the second location.

2. The HVAC system of claim 1, wherein the controller is configured to control a valve position in response to the first signal or the second signal.

3. The HVAC system of claim 2, wherein the controller is configured to control the valve position of an expansion valve in response to the first signal or the second signal.

4. The HVAC system of claim 1, wherein the controller is configured to activate or maintain operation of a fan in response to the first signal.

5. The HVAC system of claim 1, wherein the controller is configured to activate or maintain operation of a first fan in response to the first signal and a second fan in response to the second signal.

6. The HVAC system of claim 1, wherein the controllers is configured to actuate a damper to open the damper and expose a damper opening in response to the first signal or the second signal.

7. The HVAC system of claim 1, wherein the first LDM device is disposed at an evaporator corresponding to the first location.

8. The HVAC system of claim 1, wherein:
 the first LDM device comprises a first pressure switch; and
 the second LDM device comprises a second pressure switch.

9. The HVAC system of claim 1, wherein:
 the first LDM device comprises a first pressure transducer; and the second LDM device comprises a second pressure transducer.

10. A refrigerant leak detection and management assembly, comprising:
a leak detection and management (LDM) device configured to detect a pressure of a refrigerant in a refrigerant circuit of a heating, ventilation, and/or air conditioning (HVAC) system;
a controller configured to:
receive, from the LDM device, a signal indicative of a refrigerant leak in the refrigerant circuit; and
control a compressor, a valve, a fan, or any combination thereof based on the signal.

11. The refrigerant leak detection and management assembly of claim 10, comprising an additional LDM device configured to detect an additional pressure of the refrigerant at a location of the refrigerant circuit different than that of the LDM device, wherein the controller is configured to:
receive, from the additional LDM device, an additional signal indicative of an additional refrigerant leak in the refrigerant circuit; and
control the compressor, the valve, the fan, an additional valve, an additional fan, or any combination thereof based on the additional signal.

12. The refrigerant leak detection and management assembly of claim 10, wherein the LDM device comprises a pressure switch.

13. The refrigerant leak detection and management assembly of claim 10, wherein the LDM device comprises a pressure transducer.

14. The refrigerant leak detection and management assembly of claim 10, wherein the controllers is configured to actuate a damper to open the damper and expose a damper opening in response to the signal.

15. The refrigerant leak detection and management assembly of claim 10, wherein the LDM device is disposed at or adjacent to an evaporator of the HVAC system.

16. A control assembly of a heating, ventilation, and/or air conditioning (HVAC) system, the control assembly comprising:
a sensing portion configured to sense a pressure of a refrigerant in a refrigerant circuit of the HVAC system; and
at least one actuation portion configured to cause, in response to the pressure falling below a threshold pressure, actuation of a compressor to disable the compressor, activation of a fan, operation of a valve to control a positioning of the valve, or any combination thereof.

17. The control assembly of claim 16, comprising:
an additional sensing portion configured to sense an additional pressure of the refrigerant in the refrigerant circuit of the HVAC system, wherein:
the sensing portion is disposed at a location of the refrigerant circuit;
the additional sensing portion is disposed at an additional location of the refrigerant circuit; and
the at least one actuation portion is configured to cause, in response to the additional pressure falling below the threshold pressure, actuation of the compressor to disable the compressor, activation of the fan, operation of the valve to control the positioning of the valve, activation of an additional fan, operation of an additional valve to change an additional position of the additional valve, or any combination thereof.

18. The control assembly of claim 16, wherein the sensing portion comprises a pressure switch or a pressure transducer.

19. The control assembly of claim 16, wherein the at least one actuation portion is configured to actuate a damper to open a damper opening in response to the pressure falling below the threshold pressure.

20. The control assembly of claim 16, wherein the actuation portion comprises a controller.

* * * * *